United States Patent Office 2,830,047
Patented Apr. 8, 1958

2,830,047

PROCESS OF PREPARING N-(5-NITRO-2-FURFUR-YLIDENE) - 3 - AMINO - 5 - METHYL - 2 - THIO-OXAZOLIDONE AND NEW CHEMICAL COMPOUNDS EMPLOYED IN THE PRACTICE OF SUCH PROCESS

Kenyon J. Hayes, Norwich, N. Y., assignor to The Norwich Pharmacal Company, Norwich, N. Y., a corporation of New York No Drawing. Application March 4, 1957
Serial No. 643,498

5 Claims. (Cl. 260—240)

This invention relates to the preparation of the chemotherapeutic agent N-(5-nitro-2-furfurylidene)-3-amino-5-methyl-2-thiooxazolidone and aims to provide a process for the preparation of that chemotherapeutic agent and new chemical compounds which are employed as intermediates in the practice of that process. My new chemical compounds are 2-salicylidene-1-(2-hydroxypropyl) dithiocarbazic acid and N-salicylidene-3-amino-5-methyl-2-thiooxazolidone, 2-salicylidene-1-(2-hydroxypropyl) dithiocarbazic acid is represented by the following formula:

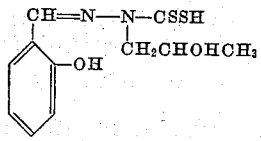

N - salicylidene - 3 - amino-5-methyl-2-thiooxazolidone is represented by the following formula:

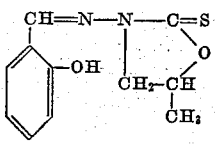

This application is a continuation-in-part of my pending application, Serial No. 533,249, filed September 8, 1955, wherein the chemotherapeutic agent N-(5-nitro-2-furfurylidene)-3-amino-5-methyl-2-thiooxazolidine is described and claimed, and wherein I have pointed out its effectiveness against protozoa such as *Endamoeba histolytica, Trichomonas vaginalis, Trichomonas foetus* and *Trypanosoma cruzi.*

I have found that 2-salicylidene-1-(2-hydroxypropyl) dithiocarbazic acid can be readily prepared by reacting 1-salicylidene-2-(2-hydroxyproyl)hydrazine with carbon disulfide at a temperature of from 5–15° C. in the presence of a base such as potassium hydroxide followed by acidification with dilute hydrochloric acid at a temperature of from 2–5° C. Such a method, which produces a sharp melting product directly useful in chemical synthesis, may be represented in stepwise fashion, as follows:

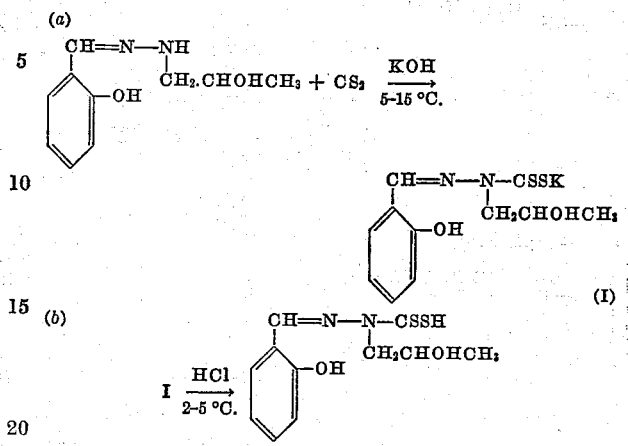

I have discovered that 2 - salicylidene - 1 -(2 - hydroxypropyl) dithiocarbazic acid can be employed as an intermediate in each of two alternative synthetic routes for the preparation of the chemotherapeutic agent, N-(5-nitro - 2 - furfurylidene)-3-amino-5-methyl-2-thiooxazolidone: A solution of that intermediate in N,N-dimethylformamide may be desulfurized, under the influence of heat, by lead acetate trihydrate also dissolved in that solvent, the lead sulfide resulting from said desulfurization being removed by filtration; the filtrate acidified with sulfuric acid; 5-nitro-2-furfural or acid hydrolyzable derivative thereof, such as its diacetate, added thereto and the mixture steam distilled to remove salicylaldehyde whereupon, with cooling, N-(5-nitrofurfurylidene)-3-amino-5-methyl-2-thiooxazolidone precipitates and is obtained upon filtration. The reaction may be represented as follows:

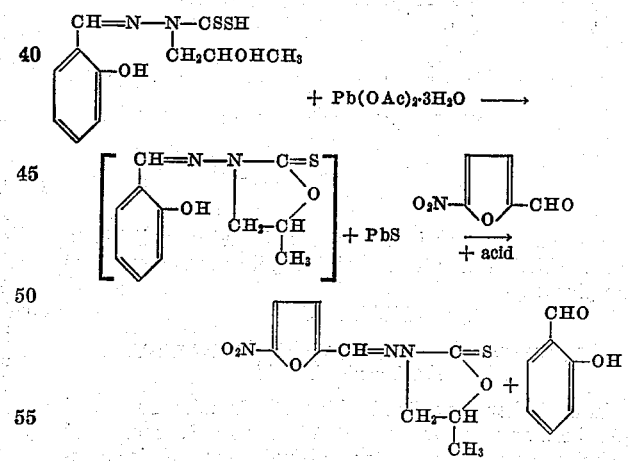

Such a synthesis of N-(5-nitro-2-furfurylidene)-3-amino-5-methyl-2-thiooxazolidone is extremely valuable as an economical method for its production for use in cases where minor amounts of impurity may be tolerated and rigorous chemical purity is not a specification. As produced by the aforesaid method, a purity of at least 95% is obtained.

Alternatively, 2-salicylidene-1-(2-hydroxypropyl) dithiocarbazic acid may be converted, under the influence of heat, to its lead salt by dissolving it in N,N-dimethylformamide and adding thereto lead acetate dissolved in acetic acid. The lead salt thus formed is filtered and then pyrolyzed by heating, at reflux temperature, a solution thereof in N,N-dimethylformamide which also contains dissolved lead acetate, whereby lead sulfide is precipitated and filtered and the cooled filtrate, upon dilution with water, yields N-(salicylidene)-3-amino-5-methyl-2-oxazolidone. The foregoing method may be represented as follows:

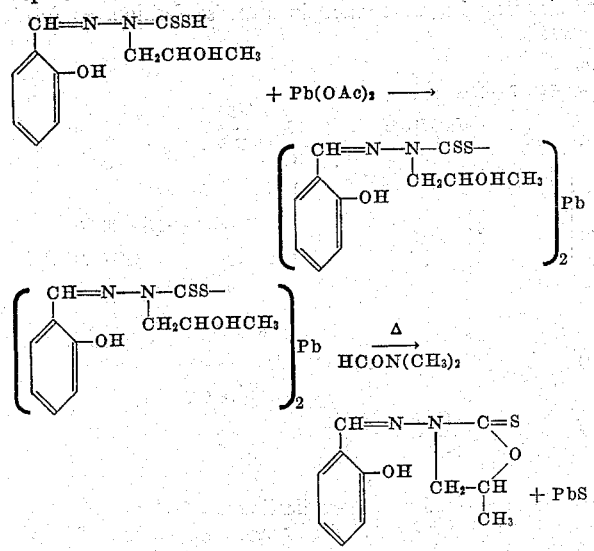

I have found that such a method affords a means of preparing and isolating the substantially pure intermediate, N-(salicylidene)-3-amino-5-methyl-2-thiooxazolidone, for the preparation of N-(5-nitro-2-furfurylidene)-3-amino-5-methyl-2-thiooxazolidone, thereby assuring a substantially chemically pure production of that chemotherapeutic agent by reaction of such intermediate with 5-nitro-2-furfural or hydrolyzable derivative thereof, such as its diacetate, in the presence of dilute mineral acid and under the influence of heat as illustrated by the following reaction scheme:

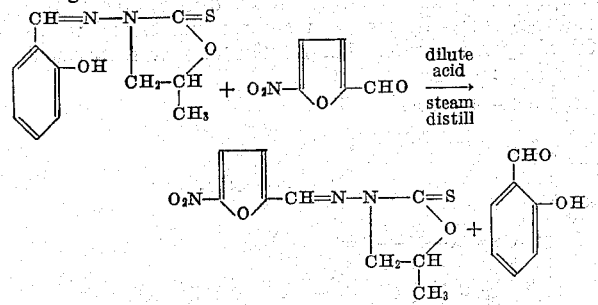

In order that my invention may be fully available to those skilled in the art, the following illustrative examples are given:

EXAMPLE I

*Preparation of 2-salicylidene-1-(2-hydroxypropyl) dithiocarbazic acid*

In a 22 liter flask, fitted with a stirrer, addition funnel and thermometer, are placed 1475 grams (13.4 moles) of technical grade 2-hydroxypropyl hydrazine. Salicylaldehyde (1635 grams; 13.4 moles) is added slowly while maintaining the temperature between 5 and 15° C. by external cooling. During one hour a solution of 939 grams (14.2 moles) of potassium hydroxide in 7.65 liters of water is added while maintaining the temperature below 15° C. by external cooling. During one and one quarter hours a solution of 1071 grams (14.1 moles) of carbon disulfide in 6.2 liters of dioxane is added at 5–15° C.

The solution is stirred one hour, then cooled to 2–5° C. and slowly acidified with 2.6 liters of 15% hydrochloric acid. The product separates as a light yellow solid, which is filtered and washed well with water, alcohol and ether. After drying to constant weight the product, 2 - salicylidene-1-(2-hydroxypropyl)-dithiocarbazic acid, weighs 1846 grams (51% yield); melting point 145–146° C.

EXAMPLE II

*Preparation of N-(5-nitro-2-furfurylidene)-3-amino-5-methyl-2-thiooxazolidone using product of Example I*

2-salicylidene-1-(2-hydroxypropyl) dithiocarbazic acid (27.0 grams; 0.1 mole) is dissolved in 50 cc. of hot dimethylformamide and added to a solution of 28.4 grams (1.5 equivalents) of lead acetate trihydrate dissolved in 50 cc. of hot dimethylformamide. The suspension is refluxed (142° C.) for one hour and the resulting lead sulfide is removed from the hot suspension by filtration. The lead sulfide is well extracted with hot dimethylformamide (50 cc.). The combined dimethylformamide solutions are placed in a steam-distillation apparatus with 200 cc. of 20% sulfuric acid and 14.1 grams of 5-nitro-2-furaldehyde. The mixture is steam distilled until the salicylaldehyde has been removed (20 minutes).

The suspension of yellow solid is diluted with 200 cc. of cold water, cooled and filtered. The solid obtained, N-(5-nitro-2-furfurylidene)-3-amino-5-methyl - 2 - thiooxazolidone, is washed with 100 cc. of hot ethanol, then rinsed with cold ethanol and ether; yield 17.0 grams, melting point 224–227° C. This may be recrystallized by dissolving in 110 cc. of hot nitromethane, decolorizing with charcoal, and then precipitating by adding 250 cc. of absolute ethanol whereupon yellow crystals amounting to 14.5 grams (56.9%), of melting point 226–227° C. and 95% pure by sulfur analysis are obtained.

EXAMPLE III

*Preparation of N-(salicylidene)-3-amino-5-methyl-2-thiooxazolidone using product of Example I*

54 grams of 2-salicylidene-1-(2-hydroxypropyl) dithiocarbazic acid are dissolved in 150 cc. of N,N-dimethylformamide which is heated to 100° C. and to that solution is added a solution of 38 grams of lead acetate in 50 cc. of hot acetic acid. A heavy yellow suspension results which upon cooling and filtering yields 75 grams of the lead salt of 2-salicylidene-1-(2-hydroxypropyl)-dithiocarbazic acid. The lead salt thus obtained is pyrolyzed to N-(salicylidene)-3-amino-5-methyl-2-thiooxazolidone as follows:

To a solution of 19 grams of lead acetate in 100 cc. of hot dimethylformamide in a 500 cc. round bottom flask which is fitted with an air condenser and heated in an oil bath, is added a solution in 100 cc. of dimethylformamide of 75 grams of the lead salt referred to above. The mixture is heated to reflux and held at that temperature for one hour. The precipitated lead sulfide is filtered from the solution while hot. The filtrate is diluted with 600 cc. of water and the white solid which results is collected. The filter cake is extracted with portions of boiling dimethylformamide (100 cc., 50 cc., 50 cc.) until no solid results on dilution with water. All crops of N-(salicylidene)-3-amino-5-methyl-2 - thiooxazolidone thus obtained are combined, washed with water, a mixture of ether and alcohol (1:1) and then dried at 110° C. In this fashion 31.4 grams, melting point 197–198° C., are obtained.

EXAMPLE IV

*Preparation of N - (5 - nitro-2-furfurylidene)-3-amino-5-methyl-2-thiooxazolidone using product of Example III*

A mixture of 23.6 grams of N-(salicylidene)-3-amino-5-methyl-2-thiooxazolidone, prepared according to the procedure outlined in Example III, 16 grams of 5-nitro- 2-furfural, 200 cc. of 20% sulfuric acid and 100 cc. of N,N-dimethylformamide is steam distilled; after 700 cc. of distillate are collected all of the salicylaldehyde has been removed. To the suspension in the still pot, 200 cc. of water are added and the flask cooled. The solid is filtered and washed three times with water. The N-(5-nitro-2-furfurylidene)-3-amino-5-methyl-2-thiooxazolidone thus obtained weighs 25 grams and has a melting point of about 224–226° C., with decomposition.

My new compound, 2-salicylidene-1-(2-hydroxypropyl) dithiocarbazic acid, is also useful as a control agent in the treatment of early blight of tomatoes caused by *Alternaria solani*. When applied as a spray containing 80 p. p. m. to Bonny Best tomato plants which are then inoculated with a suspension of spores of *Alternaria solani* and incubated in a moist chamber at 75° F. for 24 hours, an 87% control of the disease is obtained.

I have also discovered that my new compounds, 2-salicylidene-1-(2-hydroxypropyl) dithiocarbazic acid and N-(salicylidene)-3-amino-5-methyl-2-thioxazolidone, also have a pronounced effect upon carbonic anhydrase, an enzyme involved in the dehydration and hydration of carbonic acid. My new compounds, at a concentration of about $10^{-4}$ molar, protect and stabilize carbonic anhydrase against inhibition thus maintaining it available for its enzymatic function.

What I claim is:

1. The process of preparing N-(5-nitro-2-furfurylidene)-3-amino-5-methyl-2-thiooxazolidone which comprises reacting 1-salicylidene-2-(2-hydroxypropyl)hydrazine with carbon disulfide in the presence of a base to produce 2-salicylidene-1-(2-hydroxypropyl) dithiocarbazic acid, desulfurizing said acid so that ring closure is effected to produce N-salicylidene-3-amino-5-methyl-2-thiooxazolidone, and thereafter condensing said thiooxazolidone with 5-nitro-2-furaldehyde in the presence of dilute acid and under the influence of heat.

2. The process of claim 1 in which desulfurization and ring closure are effected by causing the 2-salicylidene-1-(2-hydroxypropyl) dithiocarbazic acid to react with lead acetate trihydrate to produce N-salicylidene-3-amino-5-methyl-2-thiooxazolidone and lead sulfide, and said lead sulfide is removed by filtration.

3. The process of claim 1 in which the 2-salicylidene-1-(2-hydroxypropyl) dithiocarbazic acid is caused to react with lead acetate to form the lead salt thereof, said lead salt is decomposed by subjecting it to heat to produce N-salicylidene-3-amino-5-methyl-2-thiooxazolidone and lead sulfide, and said thiooxazolidone is thereafter isolated and then condensed with 5-nitro-2-furaldehyde.

4. 2-salicylidene-1-(2-hydroxypropyl) dithiocarbazic acid represented by the formula:

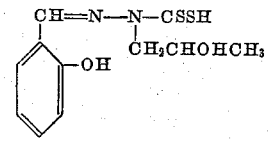

5. N-salicylidene-3-amino-5-methyl-2-thiooxazolidone represented by the formula:

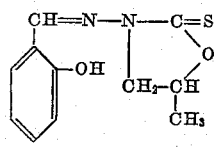

No references cited.